(12) United States Patent
Smith et al.

(10) Patent No.: US 7,707,586 B2
(45) Date of Patent: Apr. 27, 2010

(54) OPERATING SYSTEM INDEPENDENT AGENT

(75) Inventors: Carey W. Smith, Hillsboro, OR (US); Howard C Herbert, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 687 days.

(21) Appl. No.: 10/937,755

(22) Filed: Sep. 8, 2004

(65) Prior Publication Data

US 2006/0080672 A1 Apr. 13, 2006

(51) Int. Cl.
*G06F 15/16* (2006.01)
*G06F 15/163* (2006.01)
(52) U.S. Cl. .................. 719/317; 719/318; 709/223
(58) Field of Classification Search .............. 719/318, 719/317
See application file for complete search history.

(56) References Cited

U.S. PATENT DOCUMENTS

| | | | | | |
|---|---|---|---|---|---|
| 5,440,726 | A | * | 8/1995 | Fuchs et al. | 714/20 |
| 6,385,211 | B1 | | 5/2002 | Williams et al. | |
| 6,665,731 | B1 | * | 12/2003 | Kumar et al. | 709/246 |
| 6,904,391 | B2 | * | 6/2005 | Merkin et al. | 702/188 |
| 2004/0249913 | A1 | * | 12/2004 | Kaufman, Jr. | 709/223 |
| 2005/0015760 | A1 | * | 1/2005 | Ivanov et al. | 717/168 |
| 2005/0137833 | A1 | * | 6/2005 | Sistla | 702/188 |

FOREIGN PATENT DOCUMENTS

WO PCT/US2005/020549 10/2005

OTHER PUBLICATIONS

"IPMI—Intelligent Platform Management Interface Specification, v1.5, Revision 1.1". Intel, Hewlett-Packard, NEC, Dell. Feb. 20, 2002.*
Anonymous: "IPMI—Intelligent Platform Management Interface Specification v1.5", Online Article, Feb. 20, 2002, XP002346263, pp. 1-345.
"Extensible Structure for Managing System Asset Information in a Non-Volatile Storage Element: EAIA (Enhanced Asset Information Area)", Research Dislcosure, Kenneth Mason Publications, Westbourne, GB, No. 421, May 1999,.pp. 731-735, XP000888786.
International Business Machines Corporation, "Asset Information by system unit", Research Disclosure, Kenneth Mason, Publications, Westbourne, GB, vol. 430, No. 168, Feb. 2002, XP007125630.
Magee M: "Intel offers hope for corporate PC Management", The Inquirer, 'Online!', Nov. 29, 2004, XP002346264. Retrieved from the Internet: http://www.theinquirer.net/?article=19937>. Retreived on Sep. 19, 2005.
A UUID URN Namespace, Internet Draft, Internet Engineering Task Force (ETF), Jan. 2004 (50 pgs.).

(Continued)

*Primary Examiner*—Li B Zhen

(57) ABSTRACT

Described is a computing platform comprising a host processing system to host an operating system, a communication adapter to transmit data to or and receive data from a data transmission medium, and a non-volatile storage. The computing platform may also comprise an agent executable independently of the operating system to enable read-only or read/write access to at least a portion of the non-volatile storage.

29 Claims, 5 Drawing Sheets

OTHER PUBLICATIONS

TCG PC Specific Implementation Specification, Version 1.1, Aug. 18, 2003 (pp. 1-72).

Trusted Computing Platform Alliance (TCPA), Main Specification, Version 1.1b, Trusted Computing Group, Feb. 22, 2002 (pp. i-x and 1-322).

TPM Main Part 1, Design Principles Specification, Version 1.2, Revision 62, Oct. 2, 2003 (pp. i-xi and 1-150).

TMP Main Part 2, TPM Structures Specification, Version 1.2, Revision 62, Oct. 2, 2003 (pp. i-xii and 1-164).

TPM Main Part 3, Commands Specification, Version 1.2, Revision 62, Oct. 2, 2003 (pp. i-xii and 1-257).

TCG Software Stack (TSS) Specification, Version 1.10 Golden, Aug. 20, 2003 (pp. 1-314).

"Remote Insight Lights-Out Edition- retired", Hp Webpage, retrieved from the internet on Sep. 20, 2005. Retrieved from the internet at http://h18013.www.1hp.com/products/servers/management/remote-lightsout/. pp. 1-2.

Intel Corporation, Microsoft Corporation, Toshiba Corp., "Advanced Configuration and Power Interface Specification" Revision 1.0b, Feb. 8, 1999.

Office Action received for Chinese Patent Application No. 200580029795.8, mailed on Jul. 10, 2009, 17 pages.

* cited by examiner

OPERATING SYSTEM INDEPENDENT AGENT

BACKGROUND

1. Field

The subject matter disclosed herein relates to systems for use in managing computing assets. In particular, the subject matter disclosed herein relates to the use of processes capable of executing on a computing platform independently of an operating system hosted on the computing platform.

2. Information

Enterprises typically deploy computer assets that are coupled by data links in local area networks (LANs) and wide area networks (WANs). These computer assets typically host a software build which includes an operating system and one or more application programs such as word processing programs, electronic mail programs and spreadsheet programs. To manage these computer assets, an enterprise typically employs asset management applications that can determine hardware or software configuration information and maintain up-to-date inventory of the computer assets. The enterprise may also employ network security applications to enable discovery and patching of security vulnerabilities, and operating system recovery tools to recover system configurations in the event of a system crash.

BRIEF DESCRIPTION OF THE FIGURES

Non-limiting and non-exhaustive embodiments of the present invention will be described with reference to the following figures, wherein like reference numerals refer to like parts throughout the various figures unless otherwise specified.

DETAILED DESCRIPTION

Figure 1A:
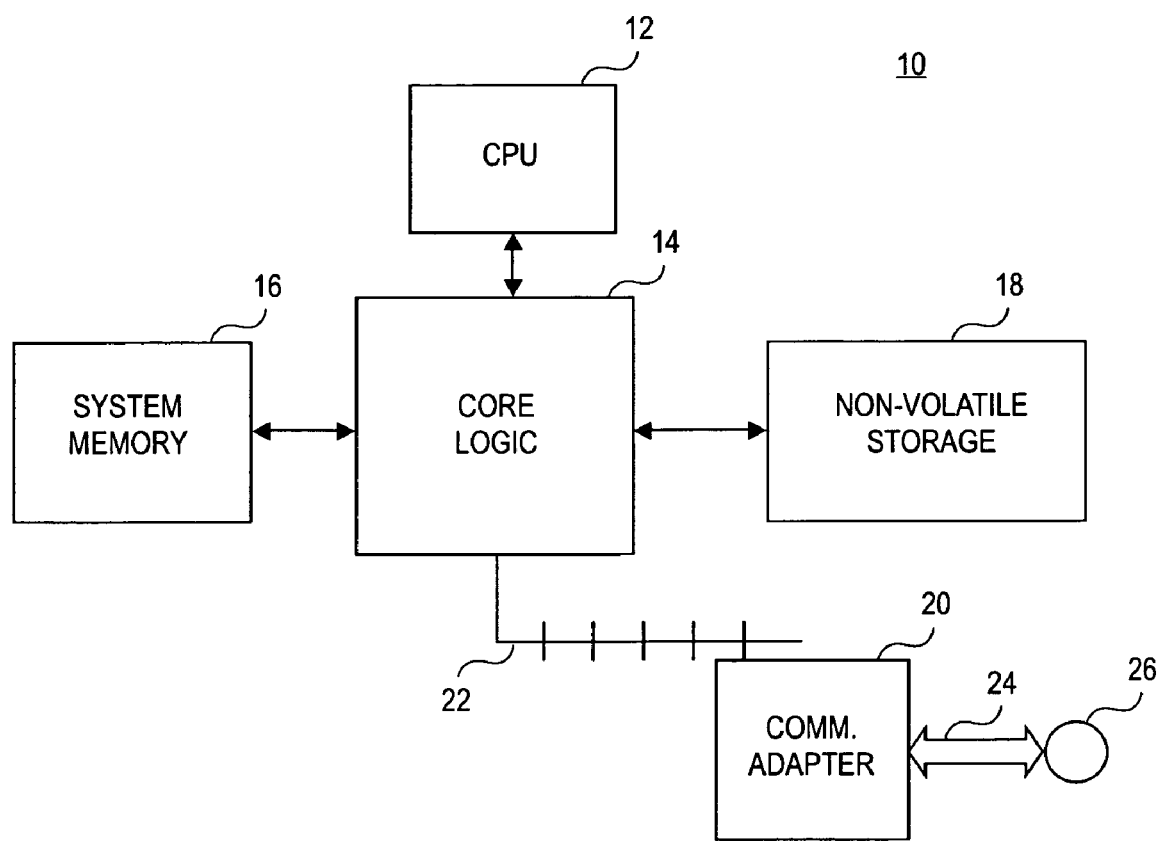
FIG. 1A shows a computing platform according to an embodiment of the present invention.

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

"Machine-readable" instructions as referred to herein relates to expressions which may be understood by one or more machines for performing one or more logical operations. For example, machine-readable instructions may comprise instructions which are interpretable by a processor compiler for executing one or more operations on one or more data objects. However, this is merely an example of machine-readable instructions and embodiments of the present invention are not limited in this respect.

A "storage medium" as referred to herein relates to media capable of maintaining expressions which are perceivable by one or more machines. For example, a storage medium may comprise one or more storage devices for storing machine-readable instructions or data. Such storage devices may comprise storage media such as, for example, optical, magnetic or semiconductor storage media. However, these are merely examples of a storage medium and embodiments of the present invention are not limited in these respects.

A "non-volatile storage" as referred to herein relates to a storage medium capable of maintaining expressions of information when power is removed from the storage medium. Such a non-volatile storage may comprise storage media such as, for example, writable optical media, magnetic media (e.g., hard disk memory) or semiconductor media (e.g., flash memory). However, these are merely examples of a non-volatile storage and embodiments of the present invention are not limited in this respect. Devices communicating with a non-volatile storage may be capable of having "read access" to a portion of the non-volatile storage to retrieve information or having "write access" to store information in a portion of the non-volatile storage.

"Logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a storage medium in combination with processing circuitry to execute such machine-readable instructions. However, these are merely examples of structures which may provide logic and embodiments of the present invention are not limited in this respect.

A "processing system" as discussed herein relates to a combination of hardware and software resources for accomplishing computational tasks. For example, a processing system may comprise a system memory and processing circuitry (e.g., a central processing unit (CPU) or microcontroller) to execute machine-readable instructions for processing data according to a predefined instruction set. However, this is merely an example of a processing system and embodiments of the present invention are not limited in this respect. A "host processing system" as referred to herein relates to a processing system which may be adapted to communicate with a "peripheral device." For example, a peripheral device may provide inputs to or receive outputs from an application process hosted on the host processing system. However, these are merely examples of a host processing system and a peripheral device, and embodiments of the present invention are not limited in this respect.

An "application program" as referred to herein relates to one or more procedures that may be executed according to machine-readable instructions to complete one or more tasks. Such an application program may be designed to provide a result according to predefined user requirements. Application programs may include, for example, electronic spreadsheets, word processing programs, asset management programs and agents, system management programs and agents, user interfaces and communication related application programs. However, these are merely examples of application programs and embodiments of the present invention are not limited in these respects.

An "operating system" as referred to herein relates to one or more executable procedures for facilitating communication between application programs and processing resources of a processing system. Such an operating system may allocate processing resources to application programs and provide an application programming interface (API) comprising callable software procedures for execution on the processing resources in support of application programs. However, these are merely examples of an operating system and embodiments of the present invention are not limited in these respects.

An "agent" as referred to herein relates to a process associated with a processing system to execute one or more defined tasks. Such tasks may include, for example, gathering information, detecting events or conditions associated with the processing system, executing procedures in response to detection of an event or condition, or enabling secure access to one or more portions of a computing platform. An agent may be hosted on a computing platform in association with a first node on a data network such that the agent may communicate through the data network with a process hosted in association with a second node on the data network. However, these are merely examples of an agent and embodiments of the present invention are not limited in these respects.

A "data transmission medium" as referred to herein relates to any media suitable for transmitting data. A data transmission medium may include any one of several mediums including, for example transmission cabling (e.g., coaxial, twisted wire pair or fiber optic cabling), wireless transmission media or power lines. However, these are merely examples of a data transmission medium and embodiments of the present invention are not limited in this respect.

A "communication adapter" as referred to herein relates to a device which may be coupled to a data transmission medium to transmit data to or receive data from other devices coupled to the data transmission medium. For example, a communication adapter may comprise a network adapter designed to transmit data to or receive data from devices coupled to a network such as a local area network. Such a network adapter may communicate with the other devices according to any one of several data communication formats such as, for example, communication formats according versions of IEEE Std. 802.3, IEEE Std. 802.11, IEEE Std. 802.16, Universal Serial Bus, Firewire, asynchronous transfer mode (ATM), synchronous optical network (SONET) or synchronous digital hierarchy (SDH) standards. In alternative embodiments, a communication adapter may comprise any one of other I/O devices such as, for example, an adapter to a data storage system. However, these are merely examples of a communication adapter and embodiments of the present invention are not limited in these respects.

Briefly, an embodiment of the present invention relates to a computing platform comprising a host processing system for hosting an operating system, a communication adapter for transmitting data to or and receive data from a data transmission medium, and a non-volatile storage. The computing platform may also comprise an agent executable independently of the operating system which enables read access or write access to at least a portion of the non-volatile storage by an external process in response to requests. However, this is merely an example embodiment of the present invention and other embodiments are not limited in these respects.

FIG. 1A shows a computing platform 10 comprising a CPU 12, a system memory 16 and core logic 14 to enable communication among devices in the computing platform 10. The CPU 12 may comprise any one of several general processors such as, for example, versions of the Pentium®, Celeron®, Xeon®, Itanium® or XScale® CPUs sold by Intel Corporation. However, these are merely examples of a CPU and embodiments of the present invention are not limited in these respects. The core logic 14 may comprise any one of several devices (e.g., a memory controller hub (MCH) and/or I/O control hub (ICH) products sold by Intel Corporation) for controlling communication among devices in a computing platform. However, these are merely examples of devices which are capable of providing core logic to a computing platform and embodiments of the present invention are not limited in these respects. The system memory 16 may comprise one or more random access memory (RAM) devices such as dynamic RAM (DRAM), synchronous DRAM (SDRAM), Rambus DRAM (RDRAM) or dual-rate DRAM (DDR). However, these are merely examples of memory devices that may be used to provide a system memory and embodiments of the present invention are not limited in these respects.

The computing platform 10 may also comprise a communication adapter 20 that is capable of transmitting data to or receiving data from a data transmission medium (e.g., wireless transmission medium, or coaxial, fiber optic or unshielded twisted wire pair cabling) according to any one of several data transmission protocols (e.g., versions of Fibre channel, IEEE Std. 802.3, IEEE Std. 802.11, IEEE Std. 802.16, Synchronous Optical NETwork/Synchronous Digital Hierarchy (SONET/SDH), Universal Serial Bus or Firewire). The communication adapter 20 may be coupled to the core logic 14 by a multiplexed data bus 22 such as a peripheral components interconnect (PCI) data bus. The core logic 14 may arbitrate read and write access transactions to the system memory 16 among other entities in the computing platform 10 such as the CPU 12 and the communication adapter 20. For example, the core logic 14 may enable byte, word or page addressable memory transactions, or direct memory access (DMA) transactions between the system memory 16 and other entities in the computing platform 10.

The computing platform 10 may comprise a non-volatile storage (NVS) 18 which is capable of storing information in addressable locations when power is removed from the computing platform 10. The NVS 18 may comprise any one of several types of non-volatile memory devices such as, for example, flash memory devices, polymer memory devices, magnetic memory devices or optical memory devices. According to an embodiment, the NVS 18 may be read or write accessible by entities or processes hosted or executed on the CPU 12, or entities or processes communicating with the computing platform 10 through the communication adapter 20. In an alternative embodiment, the communication adapter 20 may contain an embedded non-volatile memory (not shown) that is accessible by application programs.

According to an embodiment, the CPU 12 and system memory 16 may host an operating system and application programs which are executable under the control of the operating system. The application programs may be constructed to interact with an API defined by the operating system. In addition to processes and application programs under the control of the operating system, other processes may be maintained and executed independently of the operating system hosted on computing platform 10. The operating system independent processes may access portions of a non-volatile storage (e.g., NVS 18 or other non-volatile storage device (not shown) embedded in the communication adapter 20) regardless of the state of the operating system (e.g., running, in a reduced power state or disabled due to system crash). Such access by operating system independent processes may entail accessing the non-volatile storage to determine hardware or software configuration information independently of whether the operating system is running. A network security application may access the non-volatile storage to discover and patch security vulnerabilities. Operating system recovery tools may access the non-volatile storage to access hardware or software configuration information to restore applications in the event of an operating system crash.

The computing platform 10 may comprise a power management system including one or more processes hosted on the CPU 12 and system memory 16 to communicate with one or more subsystems of the computing platform 10. For example, the power management system may place the subsystems in a reduced power state in response to detecting one or more events or conditions. The power management system may cause the subsystems to subsequently resume to a full power state in response to other events. The power management system may be formed according to the Advanced Configuration and Power Interface (ACPI) as illustrated in the ACPI Specification, Rev. 1.0b, Feb. 2, 1999 (hereinafter the "ACPI Specification"). However, this is merely an example of a power management system used in conjunction with a computing platform and embodiments of the present invention are not limited in these respects.

According to an embodiment, a process under the control of the operating system or remotely executing and communicating with the computing platform 10 through the communication adapter 20 may be provided write or read access rights to portions of the non-volatile storage. For example, such a process may store or retrieve hardware or software configuration information as part of an asset management application, network security application or operating system recovery tool.

According to an embodiment, the communication adapter 20 may communicate with an external node 26 over a data transmission medium 24. The external node 26 may host processes that are capable of interacting with application programs hosted on the CPU 12 or other processes hosted on the computing platform 10. Also, by sending commands to the communication adapter 20, the external node may have read or write access to a portion of the non-volatile storage.

Figure 1B:
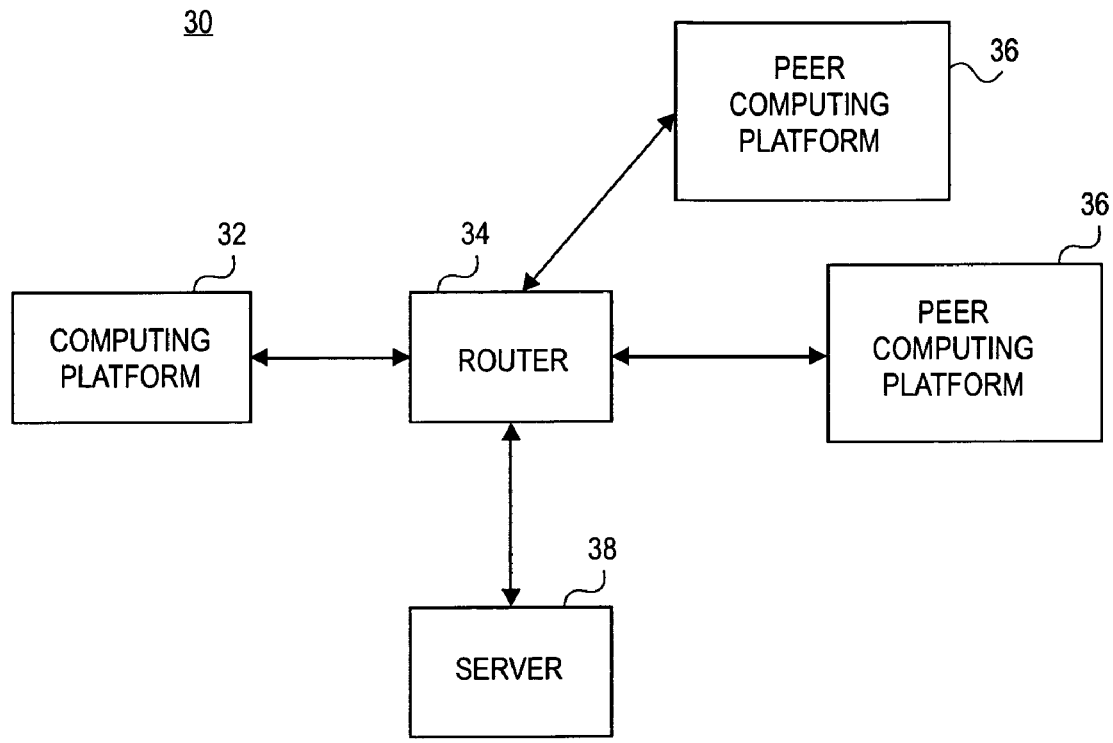
FIG. 1B shows a network topology including a computing platform according to an embodiment of the computing platform shown in FIG. 1A employed in an enterprise information technology environment.

FIG. 1B shows one use of the computing platform 10 in an enterprise information technology environment. A router 34 may route data packets among a computing platform 32 (formed according to an embodiment of the computing platform 10), peer computing platforms 36 and a server 38. Accordingly, a peer computing platform 36 or server 38 may communicate with an operating system independent agent hosted on the computing platform 32 through a communication adapter to store or retrieve information from a non-volatile storage.

Figure 1C:
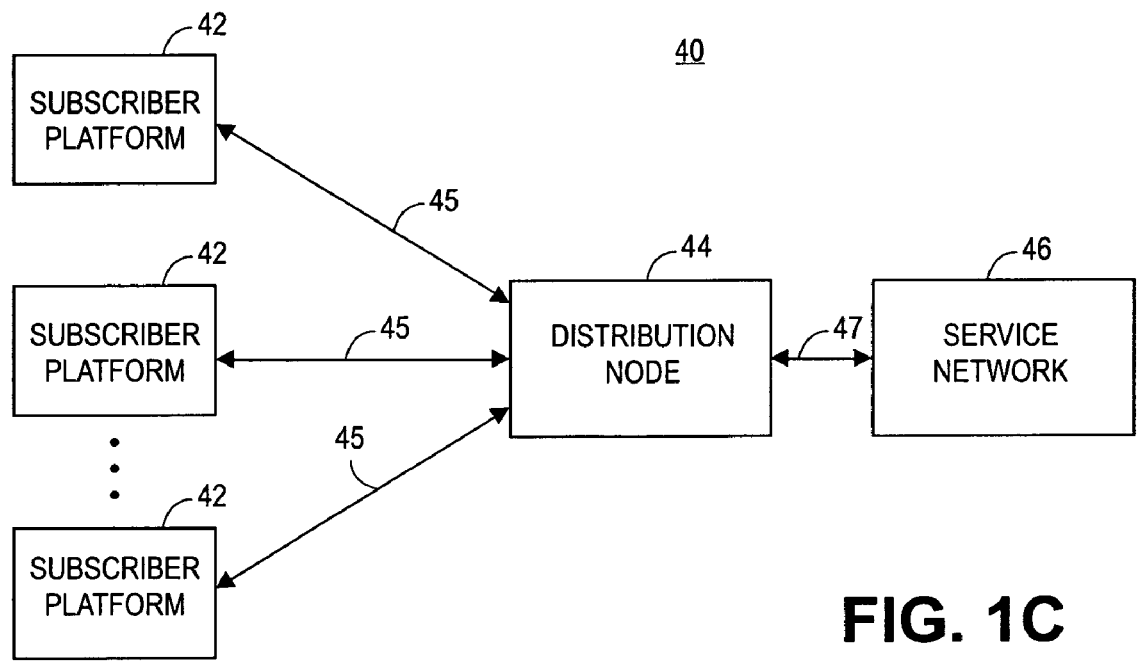
FIG. 1C shows a network topology including a computing platform according to an embodiment of the computing platform shown in FIG. 1A employed in a service network.

FIG. 1C shows an alternative use of the computing platform 10 as any one of a plurality of subscriber platforms 42 in a service network topology 40. According to an embodiment, a distribution node 44 provides voice, data or video services as part of an end-to-end infrastructure for providing services (e.g., ATM services) to the subscriber platforms 42. The distribution node 44 may be coupled to a service network by a high speed data link 47 of transmitting data packets (such as a Synchronous Optical NETwork (SONET) link capable of transmitting interleaved ATM cells or IP packets in SONET frames) to support one or more services (e.g., voice data, video data or Internet data). However, this is merely an example of how a distribution node may be coupled to a service network and embodiments of the present invention are not limited in these respects.

For providing the services to subscriber platforms 42, the distribution node 44 may comprise equipment to communicate with network elements downstream of the distribution node 44 such as, for example, a DSLAM, cable modem termination system (CMTS) or a wireless transmission base station (not shown). A subscriber platform 42 (e.g., personal computer, set-top box, hand held wireless device, broadband modem, etc.) may be coupled to the distribution node 44 by any one of several types of data links 45 capable of transmitting data to provide services to the subscriber platforms 42 such as, for example, DSL links, wireless links, coaxial cabling or Ethernet over unshielded twisted wire pair. In other embodiments, a subscriber platform may comprise additional telephony equipment (e.g., private branch exchange system) coupled to multiple devices for receiving ATM services. However, these are merely examples of how a subscriber platform may be coupled to a distribution node and embodiments of the present invention are not limited in these respects. According to an embodiment, entities coupled to the service network 46 may communicate with an operating system independent agent hosted on any of the subscriber platforms 42 through a communication adapter to store or retrieve information from a non-volatile storage maintained in the subscriber platform 42.

Figure 2:
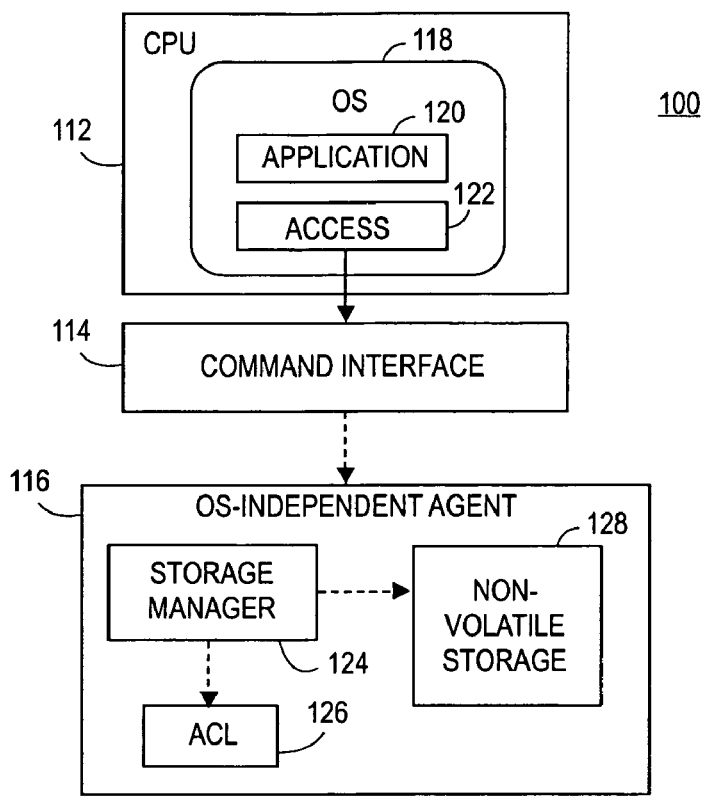
FIG. 2 shows aspects of a computing platform hosting an operating system independent agent according to an embodiment of the computing platform shown in FIG. 1.

FIG. 2 shows aspects of a computing platform 100 hosting an operating system independent agent 116 according to an embodiment of the computing platform 10 shown in FIG. 1. A CPU 112 may execute instructions of an operating system (OS) 118 to manage computing resources. The OS 118 may comprise any one of several commercially available versions of Windows® sold by Microsoft Corp., Solaris® sold by Sun Microsystems or operating systems sold by WindRiver. Alternatively, the OS 118 may comprise any one of several versions of open source Linux operating systems. However, these are merely examples of operating systems that may be hosted on a computing platform and embodiments of the present invention are not limited in these respects. Among other things, the OS 118 may control the execution of processes on the CPU 112 such as an application program 120 and access driver 122.

According to an embodiment, an OS independent agent 116 may control read and/or write access to one or more portions of a non-volatile storage 128 by either processes executed in the domain of the OS 118 or by processes executed independently of the Os 118. The features of the OS independent agent 116 may be embodied in machine-readable instructions stored on a storage medium which may be executed independently of the OS 118. In one embodiment, the CPU 112 may support multi-threaded processing (e.g., using multi-threading on a single processing core or multi-threading on multiple processing cores) and the OS independent agent 116 may be executed on a processing thread of the CPU 112 independently of a different processing thread which is executing the OS 118 and other processes in the domain of the OS 118. Alternatively, the OS independent agent 116 may be executed independently of the CPU 112 on a microprocessor or microcontroller (not shown), such as a MIPS or ARM processing core, which is embedded in the communication adapter 20 (FIG. 1). However, these are merely examples of how an agent may be hosted on a computing platform independently of an operating system and embodiments of the present invention are not limited in these respects.

According to an embodiment, the OS independent agent 116 may comprise a storage manager 124 to control allocation of portions of the non-volatile storage 128 to application programs or other processes according to allocation control data (ACD) 126. The non-volatile storage 128 may comprise one or more non-volatile memory devices (e.g., flash memory devices) that maintain firmware for a platform basic input/output system (BIOS) or private data storage. The OS independent agent 116 may control all allocation and read and write access to at least a predetermined physical portion of the non-volatile storage 128 (either contiguous or non-contiguous) which is available for allocation for use by instances of application programs or other processes. In one embodiment, the ACD 126 may comprise one or more data structures residing in a dedicated portion of the non-volatile storage 128 that is accessible through the OS independent agent 116 to the exclusion of other processes. Particular instances of an application program or other process may request an allocation of a portion of the dedicated portion of the non-volatile storage 128. For each instance of an application program, the ACD 126 may maintain a record associated with the instance including an identifier, size of total allocation available to the instance and size of current allocation to the instance. In one embodiment, the identifier in the record may be based upon a Universally Unique Identifier (UUID) according to *A UUID URN Namespace*, Internet Draft, published by the Internet Engineering Task Force (IETF), January 2004. As more than one instance of an application program may exist at any particular time, a record in the ACD 126 may be associated with a particular instance of an application program to receive an allocation of the non-volatile storage 128. A corresponding handle or identifier may uniquely distinguish a record in the ACD 126 for a particular instance of an application program from different instances of the same application program and instances of other application programs.

The storage manager 124 may allocate additional portions of the non-volatile storage 126 to a requesting application program or process up to a maximum size according to the record in the ACD 126 associated with the requesting application program or process. In one alternative embodiment, ACD 126 may indicate a maximum allocation size for all application programs or processes having a cumulative potential total memory allocation that exceeds the storage available on the dedicated portion of the non-volatile storage 128. It should be noted, however, that not all applications or processes may request an allocation of the non-volatile storage 128 as specified in the records of the ACD 126.

A manufacturer that assembles the components of the computing platform 100 may be different from a software vender that develops and provides the application programs that are to be hosted on the computing platform 100. Nevertheless, these parties may agree (e.g., by contractual arrangement) that the storage manager 124 is to maintain "partner" entries in the ACD 126 corresponding with application programs developed by the software vender. These partner entries may be distinguished from other "non-partner" records in the ACD 126 that correspond with application programs or process that are not provided by a software vendor having such an arrangement with the manufacturer. Such non-partner processes or application programs may include processes or application programs from venders that do not have a contractual relationship with the vendor of the storage manager 124. In one embodiment, the manufacturer may pre-load entries in the ACD 126 associated with partner processes or application programs when the computing platform 100 is manufactured. Entries in the ACD 126 associated with non-partner processes or application programs may be added to the ACD 126 after the computing platform 100 is deployed. Entries associated with non-partner processes or application programs may be subsequently created by, for example, application programs executing on the computing platform 100 or a remote process communicating with the computing platform 100 via the communication adapter 20, having first registered with the OS independent agent 116 as described below. Such creation of non-partner entries may be performed by a system management application under the control of a system manager in an enterprise information technology environment.

According to an embodiment, the storage manager 124 may implement different policies for allocation of the dedicated portion of non-volatile storage 128 based upon whether an allocation request is received from an instance of either a partner or non-partner application program. For example, the storage manager 124 may reserve a portion of the non-volatile storage 128 for allocation exclusively to instances of partner application programs. The storage manager 124 may then reserve the remaining portion of the non-volatile storage 128 to instances of either partner application programs or non-partner application programs.

According to an embodiment, a process or instances of an application program may request an allocation of a portion of the non-volatile storage 128 to store information such as, for example, hardware configuration information (e.g., information descriptive of the existence or status of a CPU, core logic chipset, system memory, hard drive, communication adapter(s) or other peripheral devices) and software configuration information (e.g., information descriptive of the existence or status of an operating system, application programs being hosted on the host including versions of application programs and security patch levels associated with the application programs).

According to an embodiment, application program instances or processes executing on the CPU 118 (e.g., application program instance 120) may issue commands to the OS independent agent 116 through a command interface 114. The access driver 122 may transmit commands from the application program instances or processes to the OS independent agent 116 through the command interface 114 using predefined buffers in system memory 16 (FIG. 1) which are outside the domain of the OS 118. In an embodiment in which the OS independent agent 116 is executed by a microcontroller independently of the CPU 112 (e.g., embedded in the communication adapter 20), for example, the command interface 114 may be implemented in a memory mapped I/O interface (e.g., according to the PCI local bus specification).

Remote application program instances or processes (e.g., application program instances or processes executing external to the processing platform 100) may also issue commands to the OS independent agent 116 encapsulated as in-band messages received at the communication adapter 20. After being received at the communication adapter 20, the encapsulated commands may be stored in a predefined buffer in the system memory to be retrieved by the OS independent agent 116. Alternatively, in an embodiment in which the OS independent agent 116 is executed on a microcontroller on the communication adapter 20 independently of the CPU 112, the remote applications or processes may transmit commands to the OS independent agent 116 in out-of-band messages. In other embodiments, the application program 120 may transmit commands to the OS independent agent 116 hosted on the microcontroller encapsulated in outbound packets transmitted to the communication adapter 20. The communication adapter 20 may recognize the outbound packets as commands to be provided to the OS independent agent 116 hosted on the microcontroller and provide the encapsulated commands accordingly. In one example, the communication adapter 20 may comprise an auxiliary bus to transmit portions of the outbound packets to the microcontroller for processing as described in U.S. Pat. No. 6,385,211.

Figure 3:
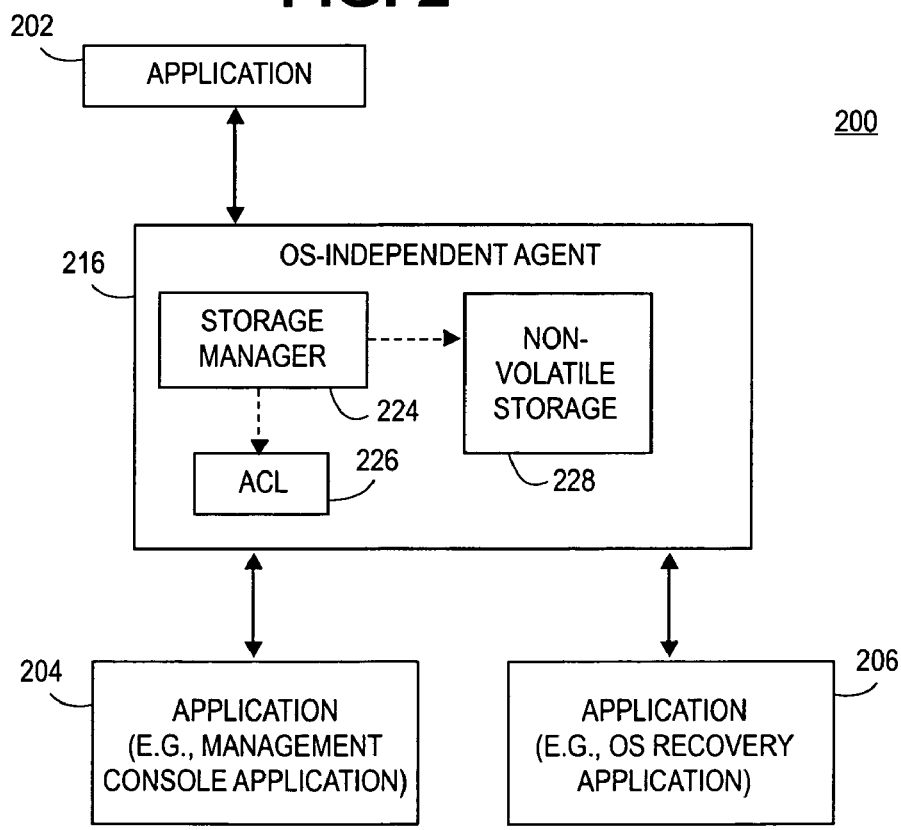
FIG. 3 illustrates interactions between an operating system independent agent and application programs according to an embodiment of the operating system independent agent shown in FIG. 2.

FIG. 3 illustrates interactions between an OS independent agent 216 and application programs or processes according to an embodiment of the OS independent agent 116 shown in FIG. 2. An application program instance 202 may exist in the domain of the operating system 118 and may communicate with the OS independent agent 116 through the command interface 114. Application program instances 204 and 206 may exist outside of the domain and control of the operating system 118 (e.g., may be executed on an external processing system or a processing thread executing independently of a processing thread executing the operating system 118). Accordingly, either of these application program instances may communicate with the OS independent agent 116 through the command interface 114 (e.g., if the application program instance is executed on an independent thread of the CPU 112) or through the communication adapter 20 (e.g., if the application program instance is executed on an external processing system).

According to an embodiment, the application program instance 202 may register its existence with a storage manager 224 to obtain a handle (or unique identifier) to be used in communicating with the storage manager 224. This registration process may occur according to a predefined protocol in which the application program instance 202 provides identification information such as a vendor name, application name, enterprise name and UUID. The storage manager 224 may then generate the handle using, for example, a hash algorithm (e.g., SHA-1) based upon the information provided by the requesting application program instance 202. The handle may then be used in future communications between the application program instance 202 and the storage manager 224.

Following the registration process with the storage manager 224, the application program instance 202 may request an allocation of an allocatable portion of the non-volatile storage 228 by transmitting an Allocate Block command to the OS independent agent 216 using the handle generated in the aforementioned registration process. In addition to including the handle, the Allocate Block command may include information such as a size of memory allocation of the non-volatile storage 228 requested. Upon receipt of the Allocate Block command, the storage manager 224 may associate the handle (in the received Allocate Block command) with information in ACD 226 for determining whether the request may be fulfilled.

According to an embodiment, following the allocation of a portion of the non-volatile storage 228 to the application program instance 202, the application program instance 202 may provide additional commands to the storage manager 224 for granting read-only or read/write access rights for the allocated portion of non-volatile storage 228 to other processes or application programs. The storage manager 224 may then control access to the allocated portion of the non-volatile storage 228 accordingly. In the presently illustrated embodiment, for example, the application program instance 202 may provide a command to the storage manager 224 for granting read-only or read/write access rights to either of the application program instances 204 or 206. In one example, the application program instance 202 may also periodically update hardware and/or software configuration information in the allocated portion of the non-volatile storage 228 by transmitting Write Block commands to the storage manager 224. Either of the application program instances 204 or 206 may then access the updated configuration information by transmitting a Read Block request to the storage manager 224.

In another example, the application program instance 204 may comprise a management console application executed externally and transmit commands to the storage manager 224 through the communication adapter 20 (FIG. 1). The management console application may enable remote management of the computing platform 100 in an enterprise information technology environment. Also, the management console application may have write access to a portion of the non-volatile storage allocated to application program instance 202 and provide updates (e.g., security patches) to a version of the associated application program currently being hosted on the computing platform 100.

In another example, the application program instance 206 may comprise an OS recovery application enabling restoration of a system state of a computing platform in the event of a system crash. Operating independently of the operating system 118, the storage manager 224 may enable the application program instance 206 to read the updated configuration information in the allocated portion of non-volatile storage 228 regardless of whether the operating system 118 is executing. If the OS independent agent 216 is executing independently of the CPU 112 (e.g., on a microcontroller or microprocessor embedded in the communication adapter 20), the storage manager 224 may also enable the application program instance 204 or 206 to remotely read the updated configuration information regardless of whether the computing platform 100 is in a full power state. Alternatively, application program instance 204 or 206 may write information (e.g., updated configuration information, patches, etc.) to an allocated portion of the non-volatile storage 228 when the computing platform 100 is in a reduced power state. Upon restoration of the computing platform 100 to a full power state (e.g., including a reset procedure), the application program 202 may retrieve the stored information from the allocated portion of the non-volatile storage 228 (e.g., as part of a power up script).

To control the allocation of the allocatable portion of non-volatile storage 228, the storage manager 224 may maintain one or more data structures of the ACD 226 in a memory (e.g., a portion of non-volatile storage 228 that is not to be allocated to application program instances but used to store the data structures used to manage the non-volatile storage 228). An application registration list (ARL) may maintain a list of each currently registered instance as identified by the handle generated for the instance in the registration process. A factory partner allocation control list (FPACL) may maintain a record of each application program associating the application program with its factory application identifier and a maximum total allocation permitted for the application program. A partner allocation control list (PACL) may maintain a record of each registered application program instance associated with a partner application program that has allocated a portion of the non-volatile storage 228 (e.g., as identified in the FPACL). Similarly, non-partner allocation control list (NACL) may maintain a record of each application program instance which is not associated with a partner application program that has allocated a portion of the non-volatile storage 228. A record in the PACL or NACL may associate the handle of a registered application program instance with a maximum allocation and the current allocation for that application program instance. An allocated block list (ABL) may identify blocks of the non-volatile storage 228 which are allocated to each of the registered instances. The record in the ABL may associate information with the allocated block such as a block handle, size and base address in the non-volatile storage 228.

Figure 4:
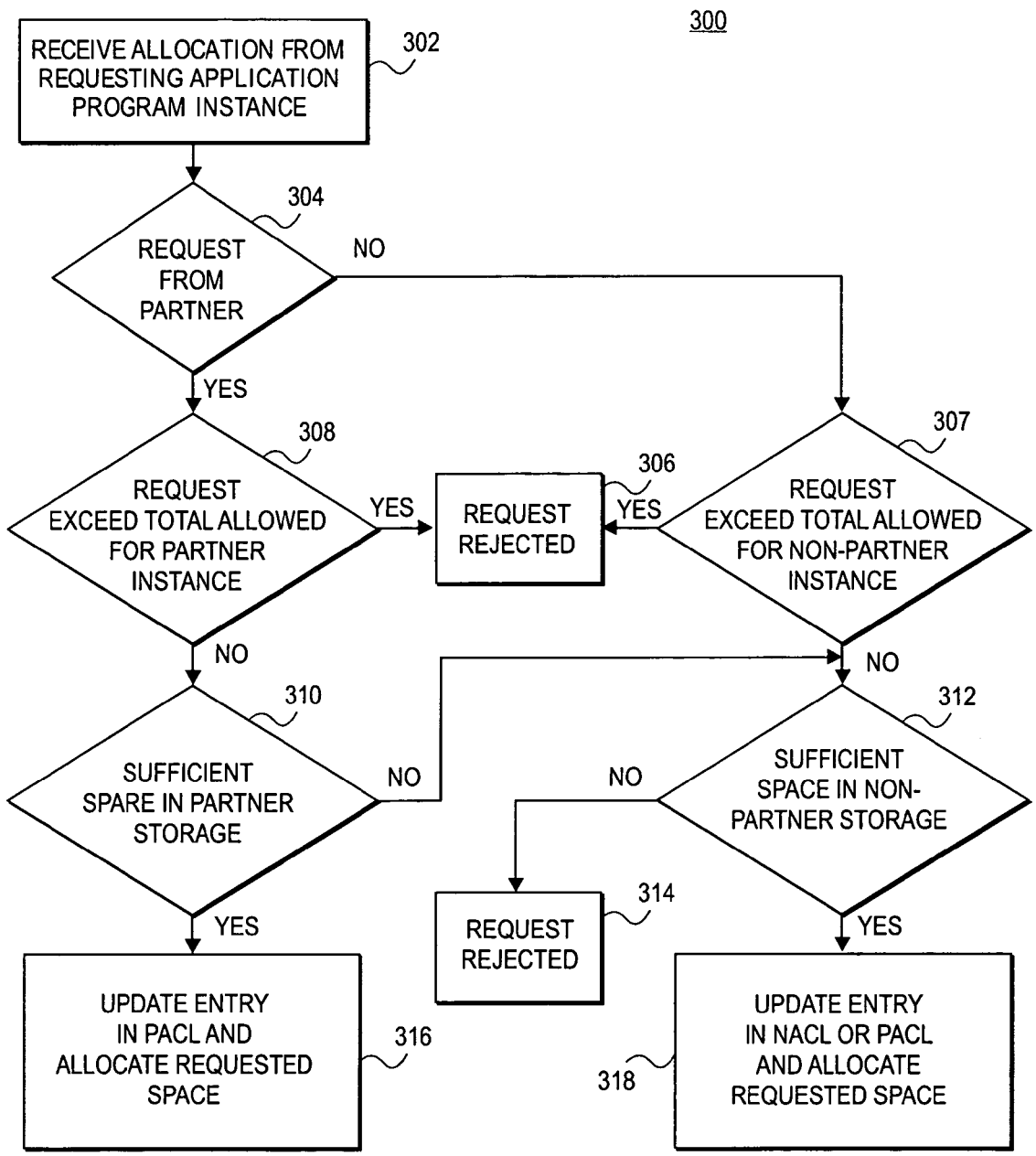
FIG. 4 shows a flow diagram illustrating a process of allocating rights to access a portion of a non-volatile storage according to an embodiment of the storage manager shown in FIG. 3.

FIG. 4 shows a flow diagram illustrating how the storage manager 224 may process allocation requests from the application program instance 202 following the aforementioned registration procedure (e.g., to assign a handle to the requesting application program instance). An Allocate Block command requesting an allocation of a block of non-volatile storage 228 may be received from an application program instance at block 302. The received Allocate Block command may include information such as the handle of the requesting application program instance and a requested size of a storage block in non-volatile storage 228.

At diamond 304, the storage manager 224 may determine whether the requesting application program instance is associated with a partner or non-partner application program (e.g., associated with either a partner vendor or non-partner vendor). For example, diamond 304 may compare the handle of the received Allocate Block command with entries in the PACL to find a match with a partner application instance (e.g., having already received an allocation of storage as indicated in the PACL). If no match is found with entries in the PACL, diamond 304 may compare the handle of the received Allocate Block command with entries in the FPACL to associate the handle with a partner application program.

In the illustrated embodiment, the entries in the FPACL establish a predefined maximum size of storage to be allocated to any one partner application program instance and global data establishes a predefined maximum size of storage to be allocated to any one non-partner application program instance. Accordingly, depending on whether the Allocate Block command is from a partner or non-partner instance application program instance, diamonds 308 and 307 may determine whether the amount of storage requested would exceed the maximum permitted for the application program instance. If the Allocate Block command is from a partner application program instance, for example, diamond 308 may determine whether the requested allocation added to the current storage allocated to the partner application program instance (e.g., as indicated in a corresponding record of the PACL) would exceed the maximum permitted for any one partner application program instance. Similarly, if the Allocate Block command is from a non-partner application program instance, diamond 307 may determine whether the requested allocation added to the current storage allocated to the non-partner application program instance (e.g., as indicated in a corresponding record of the NACL) would exceed the maximum permitted for any one non-partner application program instance. In any case, if the requested allocation would exceed the maximum permitted for the requesting application program instance, the request would be rejected at block 306 with the rejection indicated in a reply message returned to the requesting application program instance 202.

If allocation of the requested amount of storage space would not exceed the maximum amount permitted for a requesting partner instance, diamond 310 may determine whether there is sufficient space in non-volatile storage 228 reserved for partner application program instances to be allocated to the requesting application program instance. If so, block 316 may allocate the requested storage block, and update the corresponding record in the PACL to indicate the current allocation size, with the success indicated in a reply message returned to the requesting application program instance 202.

Diamond 312 may determine whether there is sufficient space in the portion of non-volatile storage 228 available for allocation to non-partner application program instances if there is not sufficient space in the portion of non-volatile storage 228 reserved for partner application program instances to accommodate an allocation request from a partner application program instance. Diamond 312 may also determine whether there is sufficient space in the portion of non-volatile storage available for allocation to non-partner application program instances for any request from a non-partner application program instance as determined at diamond 308. Upon Diamond 312 determining that there is sufficient space to grant the request, block 318 may allocate the requested space, update the corresponding record in either the PACL or NACL, to indicate the current allocation size, with the success indicated in a reply message returned to the requesting application program instance 202. Otherwise, the request may be rejected at block 314 with the rejection indicated in a reply message returned to the requesting application program instance 202.

An application program instance having received an allocation of a block of storage may conditionally share access to an allocated block with other application program instances or processes. If shared access is desired, the application program instance may initiate subsequent commands to the storage manager 224 for granting read-only or read/write access rights to the allocated block to other application program instances or processes. Upon receiving these commands, the storage manager 224 may define "permission groups" associated with an allocated block identifying other program instances or processes having either read-only or read/write access rights to the allocated block. The storage manager 224 may maintain a permissions group list (PGL) data structure having a record for each allocated block including a block handle, information to identify one or more permission groups and information specifying the type of rights granted to the application instances or processes in the identified group. Separately, for each permission group, the storage manager may maintain a group member list (GML) data structure listing each instance or process which is a member of the permission group (e.g., identified by the handle associated with the instance or process).

Figure 5:
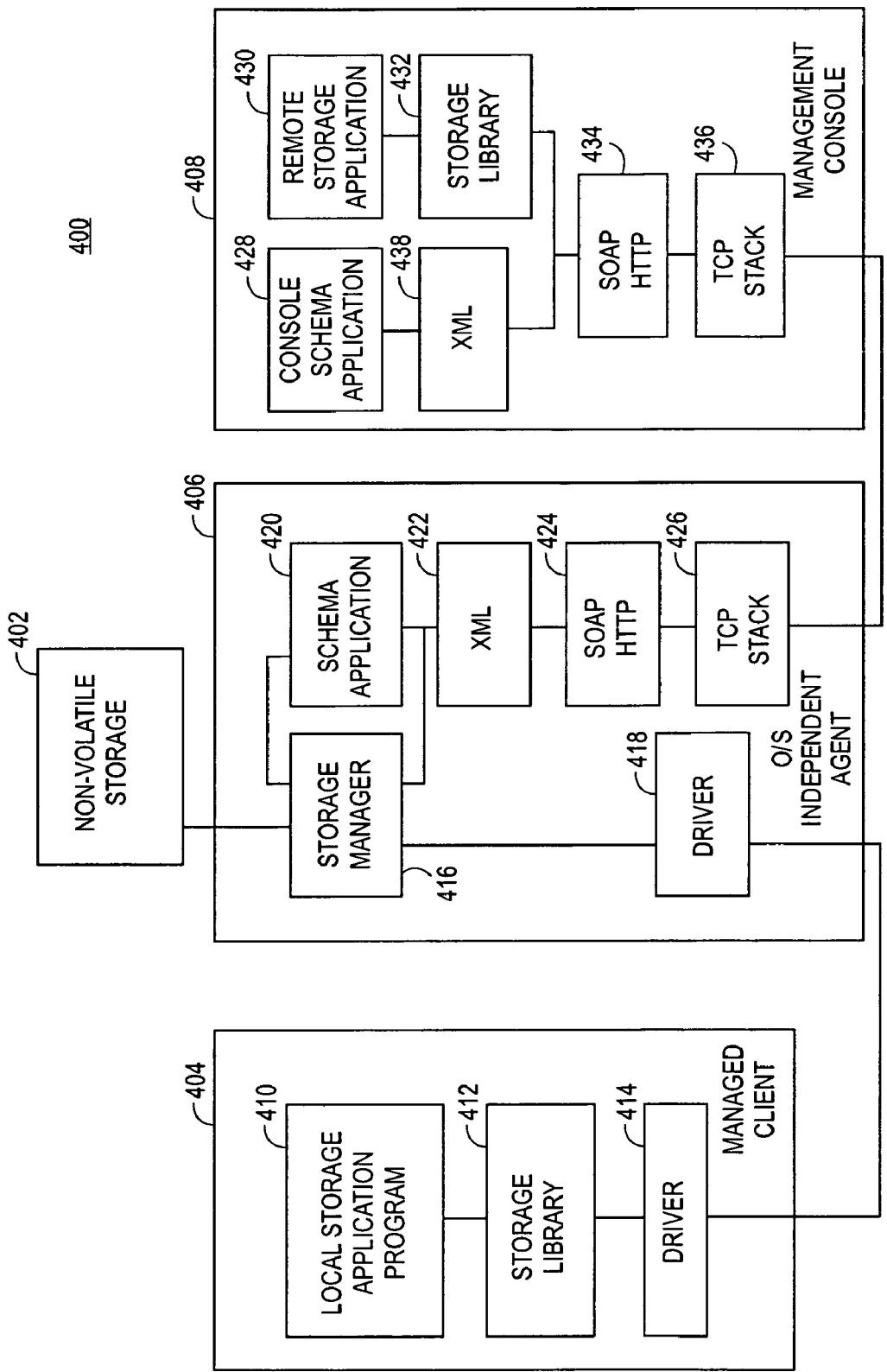
FIG. 5 shows according to an embodiment of processes interacting with a storage manager according to an embodiment of the computing platform shown in FIG. 2.

FIG. 5 shows processes interacting with a storage manager according to an embodiment of the computing platform shown in FIGS. 2 and 3. A managed client 404 may execute under the domain of an operating system (not shown) and communicate with an OS independent agent 406 through buffers defined in system memory (not shown) outside of the domain of the operating system. The managed client 404 may obtain access rights to a portion of non-volatile storage 402 as discussed above and grant access rights to that portion to a management console application program 408. A local storage application program 410 of the managed client 404 may store hardware or software configuration information in the allocated portion of non-volatile storage 402. Using the communication protocol stack of blocks 438, 434 and 436, a console schema application 428 may communicate with the OS independent agent 406 for read access of the stored configuration information. Similarly, a remote storage application 430 may use the communication protocol stack of blocks 438, 434 and 436 to write data to the allocated portion of the non-volatile storage 402 (e.g., to provide a security patch to the managed client 404).

While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A computing platform comprising:
   a host processing system comprising a central processing unit to host an operating system;
   a communication adapter to at least one of transmit data to and receive data from a data transmission medium;
   a non-volatile storage; and
   an operating system independent agent, executable independently of the operating system and regardless of whether the operating system is running, in a reduced power state, or disabled, to control at least one of read-only and read/write access to at least a portion of the non-volatile storage device by an external process in response to requests received at the communication adapter, the external process to communicate with the computing platform through the communication adapter over the data transmission medium, the portion of the non-volatile storage device allocated to an application program instance, the agent also being to determine allocation of a reserved portion of the portion of the non-volatile storage in response to a command from the application program instance based upon whether the application program instance is associated with a partner application program vendor;
   wherein the agent maintains a data structure comprising a plurality of records, each record being associated with a respective application program instance and comprising information representative of a maximum sub portion allocation of the allocatable portion, the plurality of records specifying a total of sub portion allocations exceeding the allocatable portion, one or more of the plurality of records being associated with the partner application program vendor and one or more of the records being associated with a non-partner application program vendor;
   wherein the agent further comprises:
   logic to allocate a portion of the allocatable portion in response to the command from the application program instance; and
   logic to deny the allocation of the reserved portion of the allocatable portion in response to the command if the application program instance is not associated with the partner application program vendor.

2. The computing platform of claim 1, wherein the agent is hosted by a processing thread of the central processing unit executing independently of the operating system.

3. The computing platform of claim 1, wherein the computing platform comprises one of a microcontroller and a microprocessor to host the agent independently of the central processing unit.

4. The computing platform of claim 1, wherein the host processing system hosts one or more instances of application programs in a domain of the operating system and the agent comprises logic to allocate the portion of the non-volatile memory device for use by the application program instance up to a predetermined maximum allocation size associated with the application program instance.

5. The computing platform of claim 1, wherein the host processing system hosts one or more instances of application programs in a domain of the operating system and the agent comprises logic to enable the one or more instances of application programs to store at least one of hardware and software configuration data in a predetermined portion of the nonvolatile storage.

6. The computing platform of claim 5, wherein the agent further comprises logic to enable the external process at least one of read-only and read/write access to at least a portion of the configuration data stored in the non-volatile storage in response to requests received at the communication adapter independently of the operating system.

7. The computing platform of claim 1, wherein the agent comprises: logic to identify an instance of an application program based upon a registration request message received from the communication adapter, the registration request message comprising an identifier associated with the application program; and logic to generate a unique identifier associated with the instance of the application program based upon information in the registration request message.

8. The computing platform of claim 1, wherein the communication adapter is coupled to the host processing system by a PCI interface.

9. The computing platform of claim 7, wherein the agent further comprises logic to allocate a portion of the non-volatile memory to a registered instance of an application program in response to an allocation request message received from the communication adapter.

10. The computing platform of claim 7, wherein the registration request message comprises information identifying an application program vendor.

11. The computing platform of claim 1, wherein the host processing system hosts one or more processes executed independently of the operating system.

12. The computing platform of claim 11, wherein the non-volatile storage stores one or more of hardware and software configuration information.

13. The computing platform of claim 12, wherein one of the one or more processes executed independently of the operating system comprises a network security application.

14. The computing platform of claim 13, wherein the network security application is executable to access the non-volatile storage to access one of hardware and software configuration information to discover and patch security vulnerabilities.

15. The computing platform of claim 11, wherein one of the one or more processes executed independently of the operating system comprises an operating system recovery tool executable to restore applications in the event of an operating system crash.

16. The computing platform of claim 15, wherein the operating system recovery tool is executable to access the non-volatile storage to restore one or more other applications hosted on the host processing system.

17. A method comprising:
   hosting an operating system on a computing platform, the computing platform comprising a non-volatile storage and a communication adapter;
   receiving a message from an external process at the communication adapter on a data transmission medium, the external process to communicate with the computing platform through the communication adapter over the data transmission medium;

controlling at least one of read-only and read/write access to at least a portion of the nonvolatile storage in response to the received message independently of the operating system, the portion of the non-volatile storage device allocated to an application program instance;

determining, independently of the operating system and regardless of whether the operating system is running, in a reduced power state, or disabled, allocation of a reserved portion of the portion of the non-volatile storage in response to a command from the application program instance based upon whether the application program instance is associated with a partner application program vendor;

maintaining a data structure comprising a plurality of records, each record being associated with a respective application program instance and comprising information representative of a maximum sub portion allocation of an allocatable portion, the plurality of records specifying a total of sub portion allocations exceeding the allocatable portion, one or more of the plurality of records being associated with the partner application program vendor and one or more of the records being associated with a non-partner application program vendor;

allocating a portion of the allocatable portion in response to the command from the application program instance; and denying the allocation of the reserved portion of the allocatable portion in response to the command if the application program instance is not associated with the partner application program vendor.

18. The method of claim 17, wherein the computing platform comprises a central processing unit, and wherein the method further comprises: executing the operating system on a first processing thread of the central processing unit; and executing the access to the at least a portion of the non-volatile storage in response to the received message on a second processing thread of the central processing unit.

19. The method of claim 17, the method further comprising: executing the operating system on a central processing unit of the computing platform; and executing the access to the at least a portion of the non-volatile storage in response to the received message on one of a microprocessor and a microcontroller of the computing platform independently of the central processing unit.

20. The method of claim 17, the method further comprising: hosting one or more instances of application programs in a domain of the operating system; and allocating a portion of the nonvolatile memory device for use by at least one of the one or more instances of application programs up to a predetermined maximum size associated with the at least one of the one or more instances of application programs.

21. The method of claim 17, wherein the host processing system hosts one or more application programs in a domain of the operating system, and wherein the method further comprises enabling the one or more application programs to store at least one of hardware and software configuration data in a predetermined portion of the non-volatile storage.

22. The method of claim 21, the method further comprising at least one of read-only and read/write accessing at least a portion of the configuration data stored in the non-volatile storage in response to a request received at the communication adapter independently of the operating system.

23. The method of claim 17, the method further comprising: identifying application program instance based upon a registration request message received from the communication adapter, the registration request message comprising an identifier associated with the application program instance; and generating a unique identifier associated with the application program instance based upon information in the registration request message.

24. The method of claim 23, wherein the agent further comprises logic to allocate a portion of the non-volatile memory to a registered application in response to an allocation request message received from the communication adapter.

25. The method of claim 23, wherein the registration request message comprises information identifying an application program vendor.

26. A computing platform comprising:
a host processing system comprising
a central processing unit to host an operating system;
a non-volatile storage; and
an operating system independent agent executable, independently of the operating system and regardless of whether the operating system is running, in a reduced power state, or disabled, to control at least one of read-only and read/write access to at least a portion of the nonvolatile storage device by an external process in response to requests received at the communication adapter, the external process to communicate with the computing platform through the communication adapter over the data transmission medium, the portion of the nonvolatile storage device allocated to an application program instance, the agent also being to determine allocation of a reserved portion of the portion of the non-volatile storage in response to a command from the application program instance based upon whether the application program instance is associated with a partner application program vendor;

wherein the agent maintains a data structure comprising a plurality of records, each record being associated with a respective application program instance and comprising information representative of a maximum sub portion allocation of the allocatable portion, the plurality of records specifying a total of sub portion allocations exceeding the allocatable portion, one or more of the plurality of records being associated with the partner application program vendor and one or more of the records being associated with a non-partner application program vendor;

wherein the agent further comprises:
logic to reserve the reserved portion of the allocatable portion for allocation to instances of application programs associated with the partner application program vendor;
logic to allocate a portion of the allocatable portion in response to the command from the application program instance; and
logic to deny the allocation of the reserved portion of the allocatable portion in response to the command if the application program instance is not associated with the partner application program vendor.

27. The computing platform of claim 26, wherein the agent is capable of allocating the sub portion to the application program instance in response to the command.

28. The computing platform of claim 26, wherein the agent is capable of: allocating the sub portion to the application program instance in response to a first command from the application program instance; and allocating the sub portion to a process other than the application program instance in response to a second command from the application program instance.

29. The computing platform of claim 28, wherein the computing platform further comprises a communication adapter, and wherein the process other than the instance of the application program is hosted on a processing system communicatively coupled to the computing platform by the communication adapter.

* * * * *